US009116236B1

(12) United States Patent
Billsberry et al.

(10) Patent No.: US 9,116,236 B1
(45) Date of Patent: Aug. 25, 2015

(54) AIRCRAFT DISTANCE MEASURING EQUIPMENT WITH DIRECTIONAL INTERROGATION

(75) Inventors: Mark A. Billsberry, Indialantic, FL (US); Shawn M. Mason, Satellite Beach, FL (US)

(73) Assignee: Rockwell Collins, Inc., Cedar Rapids, IA (US)

(*) Notice: Subject to any disclaimer, the term of this patent is extended or adjusted under 35 U.S.C. 154(b) by 511 days.

(21) Appl. No.: 13/604,101

(22) Filed: Sep. 5, 2012

(51) Int. Cl.

| | |
|---|---|
| ***G01S 13/00*** | (2006.01) |
| ***G01S 13/74*** | (2006.01) |
| ***G01S 13/08*** | (2006.01) |
| ***G01S 13/78*** | (2006.01) |
| *G08G 5/00* | (2006.01) |

(52) U.S. Cl.
CPC ............ *G01S 13/785* (2013.01); *G08G 5/0008* (2013.01)

(58) Field of Classification Search
CPC .............. G01S 13/765; G01S 13/785–13/788; G01S 13/82; G01S 13/91; G01S 13/913; G01S 13/9303; G08G 5/0013; G08G 5/0008; G08G 5/0078; G08G 5/0082; G08G 5/0021; G08G 5/0026; G01C 23/00
USPC ............................................. 342/29–52, 175
See application file for complete search history.

(56) References Cited

U.S. PATENT DOCUMENTS

| | | | | |
|---|---|---|---|---|
| 5,552,788 | A * | 9/1996 | Ryan et al. | 342/30 |
| 6,208,284 | B1 * | 3/2001 | Woodell et al. | 342/30 |
| 6,313,783 | B1 * | 11/2001 | Kuntman et al. | 342/32 |
| 7,006,032 | B2 * | 2/2006 | King et al. | 342/29 |
| 7,385,560 | B1 * | 6/2008 | Maloratsky et al. | 343/705 |
| 7,436,350 | B1 * | 10/2008 | Maloratsky et al. | 342/30 |
| 7,439,901 | B2 * | 10/2008 | Needham et al. | 342/30 |
| 7,508,343 | B1 * | 3/2009 | Maloratsky et al. | 342/374 |
| 7,724,178 | B2 * | 5/2010 | Brandao et al. | 342/29 |
| 7,941,248 | B1 * | 5/2011 | Tsamis et al. | 701/3 |
| 7,978,121 | B2 * | 7/2011 | Brandao et al. | 342/30 |
| 8,269,684 | B2 * | 9/2012 | Robin et al. | 343/749 |
| 8,344,935 | B1 * | 1/2013 | Hoffmann et al. | 342/30 |
| 8,577,307 | B1 * | 11/2013 | Hoffmann et al. | 455/98 |
| 8,593,330 | B2 * | 11/2013 | Jones et al. | 342/30 |
| 2005/0156777 | A1 * | 7/2005 | King et al. | 342/29 |
| 2007/0200741 | A1 * | 8/2007 | Hunter | 341/126 |
| 2008/0068250 | A1 * | 3/2008 | Brandao et al. | 342/30 |
| 2008/0174472 | A1 * | 7/2008 | Stone et al. | 342/30 |
| 2008/0174473 | A1 * | 7/2008 | Smith et al. | 342/32 |
| 2010/0117886 | A1 * | 5/2010 | Brandao et al. | 342/29 |
| 2010/0292871 | A1 * | 11/2010 | Schultz et al. | 701/3 |
| 2011/0298649 | A1 * | 12/2011 | Robin et al. | 342/30 |
| 2013/0015998 | A1 * | 1/2013 | Jones et al. | 342/30 |

* cited by examiner

*Primary Examiner* — Peter Bythrow
(74) *Attorney, Agent, or Firm* — Angel N. Gerdzhikov; Donna P. Suchy; Daniel M. Barbieri

(57) ABSTRACT

A multi-function avionics system that includes, but is not limited to, a combined traffic collision avoidance system (TCAS) and directional measuring equipment (DME) system that utilizes a multi-function directional antenna for both functions. The multi-function system utilizes the same directional antenna for TCAS and DME functions, which typically utilize the same communication frequency band. The multi-function antenna may include four antenna elements that discriminate the direction of the DME ground station squitter. The DME system establishes a bearing to the ground station from the squitter and uses this information to determine which directional beam to use for the DME interrogation. Directional DME interrogation reduces the power requirements relative to that required for omni-directional DME interrogation. The integration of DME and TCAS enables the removal of antennas and feeder cables from the aircraft, saving weight, drag and cost.

25 Claims, 3 Drawing Sheets

AIRCRAFT DISTANCE MEASURING EQUIPMENT WITH DIRECTIONAL INTERROGATION

TECHNICAL FIELD

The present invention relates to aviation and, more particularly, to aircraft distance measuring equipment (DME) with directional interrogations provided through a multi-function directional antenna that is also used as part of a traffic collision avoidance system (TCAS).

BACKGROUND

In the field of aviation, distance measuring equipment (DME) refers to equipment onboard the aircraft that communicates with a DME ground transponder to determine the distance from the aircraft to the DME ground transponder when the aircraft is within the DME ground transponder's service volume. The DME ground transponder continually transmits a signal, generally referred to as a squitter, which an aircraft receives as it enters the DME station's service volume. When the aircraft wants to receive range data from the DME ground station, the DME onboard the aircraft responds to the squitter by interrogating the DME ground station. Typical applications for DME include navigation while en route, during terminal operations and during the approach and landing phases of a flight. The ground station responds to the interrogation automatically with a known time delay. The DME onboard the aircraft measures the time difference between the original interrogation and the reply and uses this to compute the distance of the aircraft from the DME ground station.

In a conventional arrangement, the DME system onboard the aircraft is a relatively high power (e.g., 1,000 Watts) system with an omni-directional antenna system configured to communicate with the ground station at any bearing (azimuth angle) that may exist between the aircraft and the ground station. Although directional antennas can be used to reduce transmit power requirements, conventional DME systems are provided with a relatively high power, omni-directional antenna system from the original equipment manufacturer (OEM). Replacing the existing omni-directional antenna with a directional antenna and replacing the original DME amplifier with a lower power amplifier is typically not a cost effective option.

In order to reduce size, weight, power and cost it is desirable to integrate the various radios on an aircraft. This is only possible with a multi-function antenna. This interrogation avoids the unnecessary duplication of antennas, RF feeder cables, RF amplifiers and other circuits. The proposed invention aids in the integration of TCAS, DME and the Airborne Transponder functions.

SUMMARY

The invention may be embodied in an integrated avionics system that includes a combined traffic collision avoidance system (TCAS) and directional measuring equipment (DME) system that utilizes a multi-function directional antenna for both functions. The integrated avionics typically would include the TCAS and DME controllers within a common enclosure and may include separate TCAS and DME amplifiers or a common multi-function amplifier. The integrated system may include, but is not limited to, the DME, TCAS and airborne transponder systems.

The proposed system may utilize a phase-based directional discrimination system or an amplitude-based directional discrimination system. For an integrated avionics system with a four-element directional antenna, the phase-based directional discrimination system includes an integrated radio with four transceivers and an electronically steered antenna array. The amplitude-based directional discrimination system utilizes a four element antenna and includes an integrated radio with one transmitter and four receivers along with an antenna with an analog matrix beam steering network, such as a Butler matrix beam steering network.

The multi-function directional antenna is shared by the DME and the TCAS when both systems are operational. The DME and TCAS systems transmit at very low duty cycles and are not required transmit simultaneously. On the conventional installation, the individual L-Band systems (DME, TCAS and Transponder) are prevented from performing simultaneous transmissions using the L-Band suppression bus. The DME and TCAS systems have different receive frequencies enabling the two systems to share a common antenna.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which.

DETAILED DESCRIPTION OF ILLUSTRATIVE EMBODIMENTS

The present invention may be embodied in a multi-function avionics system that includes a combined traffic collision avoidance system (TCAS) and distance measuring equipment (DME) system that utilizes a multi-function directional antenna for both functions. For example, the invention may be deployed as an upgrade to an existing avionics system, such as the Rockwell Collins® TSS-4100 traffic surveillance system. The upgraded, dual use system utilizes the same directional antenna for TCAS and DME functions, which typically utilize the same communication frequency band. One example of the multi-function antenna may include four antenna elements that discriminate the direction of the DME squitters and provide four directional beams for directional interrogations. The DME system establishes a bearing to the ground station from the DME squitters and uses this information to determine which directional beam to use for the DME interrogation. The use of directional DME interrogation reduces the transmitter power requirements relative to a conventional omni-directional DME interrogation. In practice the required power is approximately one half that a conventional omni-directional implementation due to the non-ideal gain of the directional antenna.

The multi-function system may utilize a phase-based DME directional discrimination system or an amplitude-based directional discrimination system. For a multi-function avionics with a four-element directional antenna, the phase-based directional discrimination system includes an integrated radio with four transceivers and an electronically steered antenna array. The amplitude-based directional discrimination system uses a four element antenna includes an integrated radio with one transmitter, four receivers. An analog matrix beam steering network, such as a Butler matrix beam steering network, interconnects the transmitter and the receivers with the four elements of the directional antenna. Other types of directional antennas may be utilized with an integrated radio to match.

The multi-function directional antenna is shared by the DME and the TCAS when both systems are operational. The DME and TCAS systems transmit at very low duty cycles and are not required transmit simultaneously. On the conventional installation the individual L-Band systems are prevented from performing simultaneous transmissions using the L-Band suppression bus. The DME and TCAS systems have different receive frequencies enabling the two systems to share a common antenna. In new avionics platforms originally designed for multi-function operation, a single multi-function amplifier will typically be provided for both TCAS and DME communications.

Figure 1:
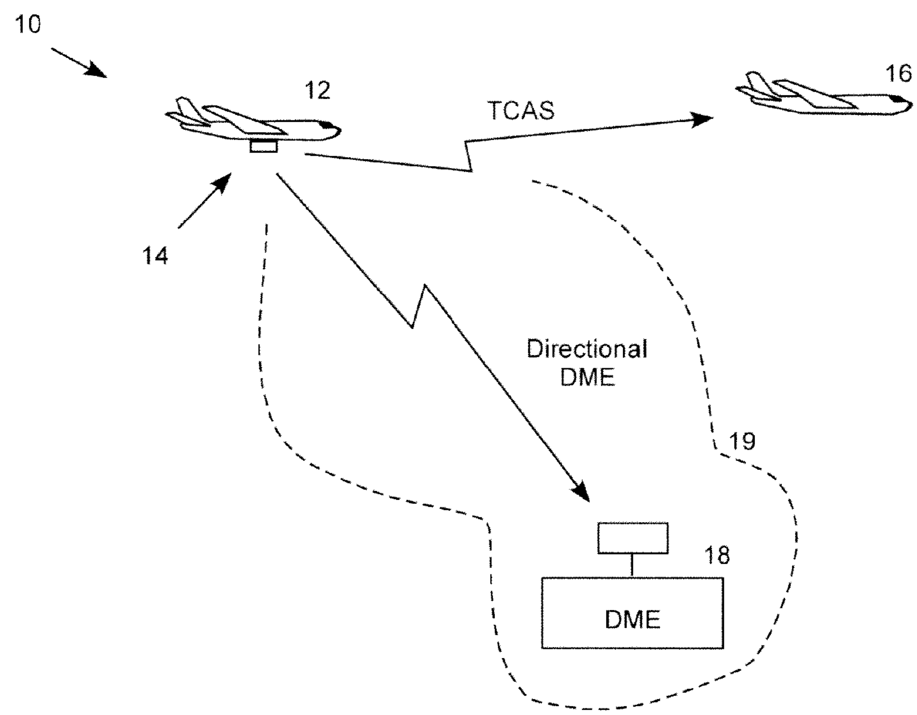
FIG. 1 is a conceptual illustration of a multi-function avionics system including directional DME capability.

FIG. 1 is a conceptual illustration of an aircraft system 10 including a host aircraft 12 carrying a multi-function avionics system 14 implementing directional DME interrogations. The multi-function avionics system 14 includes a traffic collision avoidance system (TCAS) for preventing collisions with other aircraft, as exemplified by the intruder aircraft 16. The multi-function avionics system 14 also includes distance measuring equipment (DME) for determining the distance to a DME ground station ground station 18. The directional DME communications between the avionics system 14 and the ground station 18 are represented by the directional antenna beam 19.

The TCAS and DME systems typically operate on the same frequency band but have conventionally been implemented with separate controllers and antennas. In particular, the TCAS antenna is typically a directional antenna to satisfy the objective of determining a bearing to the intruder aircraft. DME, on the other hand, is conventionally implemented with an omni-directional antenna configured to communicate with the DME ground station no matter what the bearing may be between the aircraft and the ground station. However, the use of an omni-directional antenna requires higher power over the power that would be required for interrogations using a directional antenna. The invention recognizes the ability to avoid duplication of resources by utilizing the directional TCAS antenna to provide directional DME. This reduces the power requirement for DME while also removing the need for separate antennas, feeder cables and radios for TCAS and DME. The TCAS and DME power amplifiers may be separate or may also be combined to improve the economic benefit of the multi-function avionics system. Accordingly, the invention provides for directional DME through dual-use of the TCAS directional antenna for both TCAS and directional DME communications.

Figure 2:
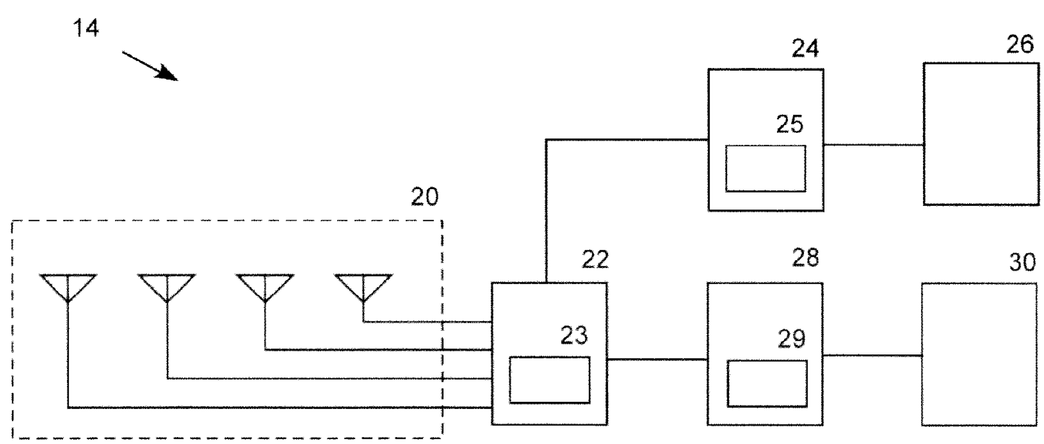
FIG. 2 is a functional block diagram of a multi-function avionics system including directional DME capability.

FIG. 2 is a functional block diagram of the multi-function avionics system 14, which includes a multi-function directional antenna 20. The example antenna shown in FIG. 2 includes four elements for generating directional interrogation beams and determining the angle of arrive of incoming DME or TCAS signals. The multi-function avionics system 14 also includes an integrated radio 22 with combined TCAS and DME functionality. The integrated radio 22 is connected to a DME controller 24, which drives a DME display 26 in the cockpit of the aircraft. The integrated radio 22 is also connected to a TCAS controller 28, which drives a TCAS display 30 in the cockpit of the aircraft.

In one embodiment, the integrated radio 22 includes a dual use power amplifier 23 that provides power for both DME and TCAS operations. This embodiment is well suited to a new equipment embodiment in which the multi-function amplifier is implemented as part of the OEM design. The TCAS system typically includes a separate power amplifier 29, while the DME system includes its own power amplifier 25 that has a lower power requirement (e.g., 500 Watts) in comparison to the power amplifier required for an omni-directional DME system (e.g., 1,000 Watts). The multi-function system avoids the need for a separate high power (e.g., 1,000 Watt) DME power amplifier, and a separate omni-directional DME antenna, as used in conventional omni-directional DME systems.

Figure 3:
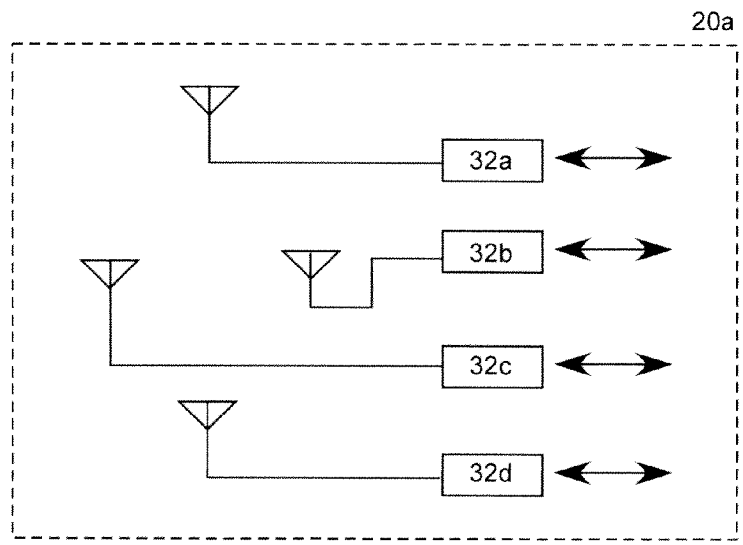
FIG. 3 is a functional block diagram of a multi-function avionics system including a phase based direction discrimination system.

FIG. 3 is functional block diagram of a phase-based directional DME system that includes an integrated radio **22*a* with four transceivers 32*a*-32*d*. Each transceiver is associated with a corresponding directional element of the antenna. This embodiment also includes an active electronically steered array (AESA) 20*a*** that controls the direction of the beam from the antenna.

Figure 4:
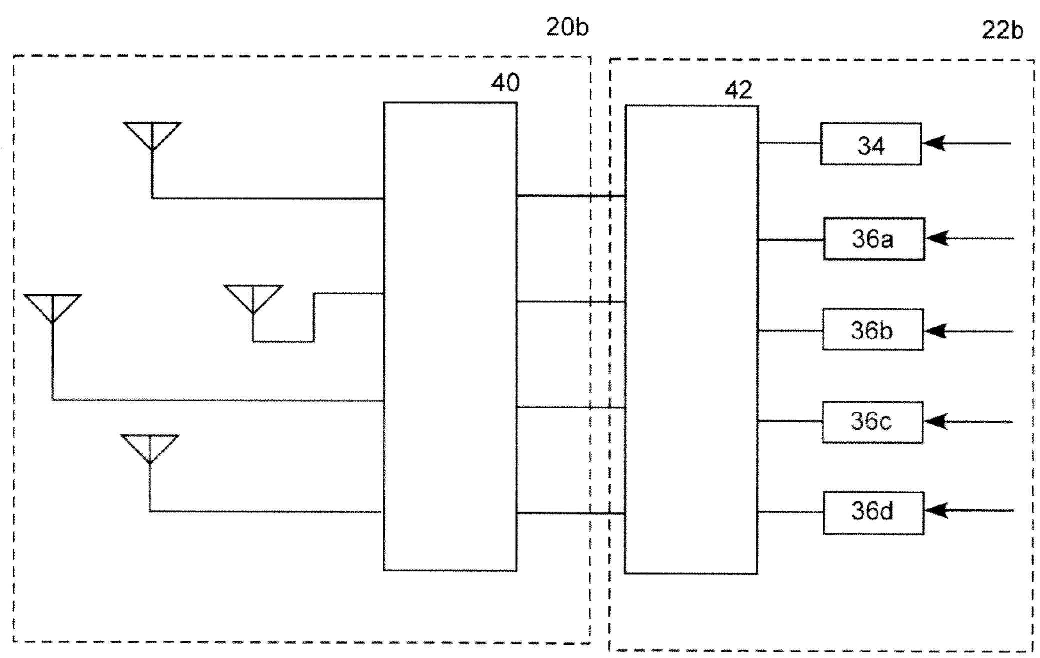
FIG. 4 is a functional block diagram of a multi-function avionics system including an amplitude based direction discrimination system.

FIG. 4 is functional block diagram of an amplitude-based DME directional discrimination system that includes an integrated radio **22*b* with one transmitter 34 and four receiver 36*a*-36*d*. Each receiver is associated with a corresponding directional beam of the antenna. In FIG. 4 the left side of the matrix is connected to the elements, the right side has beam which are comprise of the phase combined signals from the four elements. This embodiment also includes an analog matrix beam steering network, such as a Butler matrix beam steering network 40 that produces directional beam signals suitable for transmission and reception via the directional antenna elements of the antenna 20*b*. The Butler matrix is interconnected with a switching matrix 42** for selecting among the outputs of the for directional DME and TCAS communications. It will be appreciated that other types of directional antennas may be utilized with a corresponding integrated radio.

Figure 5:
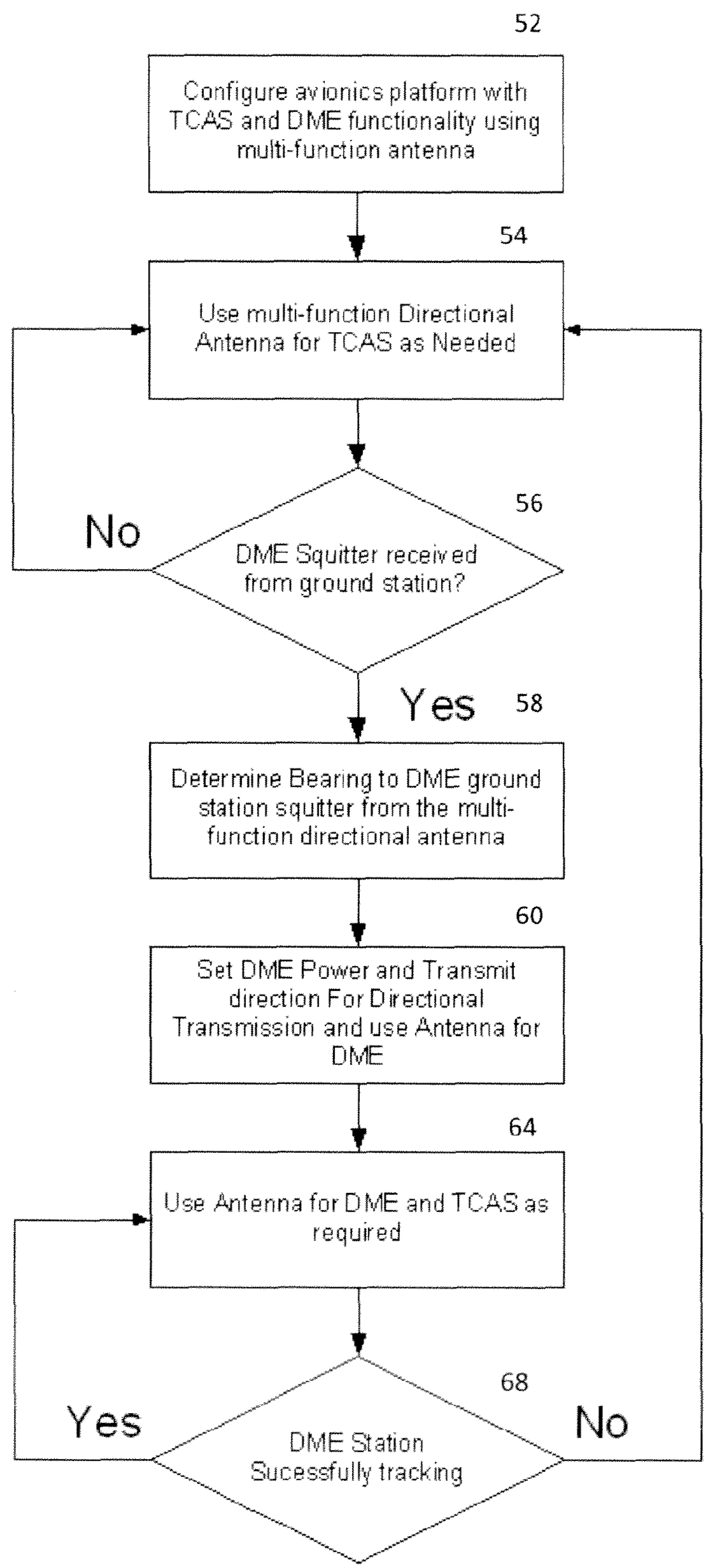
FIG. 5 is a logic flow diagram for operating a multi-function avionics system including directional DME capability.

FIG. 5 is a logic flow diagram illustrating a routine 50 for operating the multi-function avionics system including directional DME capability. In step 52, an avionics platform is configured with TCAS and DME functionality using a common, multi-function directional antenna. Step 52 is followed by step 54, in which the multi-function directional antenna is used for TCAS communications, as needed. Step 54 is followed by step 56, in which the DME controller determines whether a DME squitter signal has been received from a DME ground station. If a DME squitter signal has not been received from a DME ground station, the "NO" branch is followed from step 56 back to step 54, in which the multi-function directional antenna continues to be used for TCAS communications, as needed. If a DME squitter signal has been received from a DME ground station, the "YES" branch is followed from step 56 to step 58, in which the DME controller determines the bearing to the DME ground station from the multi-function directional antenna. Step 58 is followed by step 60, in which the DME controller sets the power and selects the directional beam of the multi-function directional antenna and engages in directional DME communications with the DME ground station.

Step 60 is followed by step 64, in which the DME and TCAS share use of the multi-function directional antenna for concurrent TCAS and DME operations. Step 64 is followed by step 68, in which it is determined whether the DME station is successfully tracking. If the DME station is successfully tracking, the "YES" branch is followed from step 68 back to step 64, in which the DME and TCAS share use of the multi-function directional antenna for concurrent TCAS and DME operations. If the DME station is not successfully tracking, the "NO" branch is followed from step 68 to step 54, in which the multi-function directional antenna is used for TCAS communications, as needed.

The present invention may include (but not required to include) adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The invention claimed is:

1. An avionics system configured for location onboard an aircraft, comprising:
- a traffic collision avoidance system (TCAS) controller;
- a distance measuring equipment (DME) controller;
- an integrated radio coupled to the TCAS controller and to the DME controller; and
- a multi-function directional antenna operatively connected to the integrated radio configured to transmit and receive directional TCAS and directional DME communications;
- wherein the multi-function directional antenna is only used to transmit and receive directional DME communications after receipt of a squitter signal from a ground station.

2. The avionics system of claim 1, wherein:
- the directional antenna comprises a plurality of antenna elements; and
- the integrated radio comprises a plurality of electronically controlled transceivers, each transceiver associated with a corresponding directional antenna element.

3. The avionics system of claim 1, wherein:
- the directional antenna comprises a plurality of directional antenna elements and an analog beam forming network; and
- the integrated radio comprises a transmitter, a plurality of receivers with each receiver associated with a corresponding directional antenna beam; and
- a switching matrix interconnecting the transmitter and the receivers with a Butler Matrix.

4. The avionics system of claim 1, wherein the DME controller, the TCAS controller, the integrated radio and the multi-function directional antenna configured to be adapted to presently existing systems.

5. The avionics system of claim 1, wherein the DME controller and the TCAS controller each have separate power amplifiers.

6. The avionics system of claim 1, wherein the DME controller and the TCAS controller share a common, multi-function power supply.

7. The avionics system of claim 1, wherein the DME controller and the TCAS controller are configured to share communications over the multi-function directional antenna when DME and TCAS operations are concurrently active.

8. An aircraft having an onboard avionics system, comprising:
- a traffic collision avoidance system (TCAS) controller;
- a distance measuring equipment (DME) controller; and
- an integrated radio coupled to the TCAS controller and to the DME controller; and
- a multi-function directional antenna operatively connected to the integrated radio configured to transmit and receive directional TCAS and directional DME communications;
- wherein the multi-function directional antenna is only used to transmit and receive directional DME communications after receipt of a squitter signal from a ground station.

9. The aircraft of claim 8, wherein:
- the directional antenna comprises a plurality of directional antenna elements; and
- the integrated radio comprises a plurality of electronically adjusted transceivers, which in conjunction with the antenna forms an electrically steered array.

10. The aircraft of claim 8, wherein:
- the directional antenna comprises a plurality of directional antenna elements and an analog matrix beam steering network; and
- the integrated radio comprises a transmitter, a plurality of receivers with each receiver associated with a corresponding directional antenna beam; and
- a switching matrix interconnecting the transmitter and the receivers with the analog matrix beam steering network.

11. The aircraft of claim 8, wherein the DME controller, the TCAS controller, and the multi-function directional antenna configured to be adapted to presently existing systems.

12. The aircraft of claim 8, wherein the DME controller and the TCAS controller each have separate power amplifiers.

13. The aircraft of claim 8, wherein the DME controller and the TCAS controller share a common, multi-function power supply.

14. The aircraft of claim 8, wherein the DME controller and the TCAS controller are configured to share communications over the multi-function directional antenna when DME and TCAS operations are concurrently active.

15. A method for an avionics system, comprising:
- providing a traffic collision avoidance system (TCAS) controller onboard the aircraft;
- providing a distance measuring equipment (DME) controller onboard the aircraft;
- providing an integrated radio onboard the aircraft coupled to the TCAS controller and to the DME controller; and
- providing a multi-function directional antenna onboard the aircraft operatively connected to the integrated radio configured to transmit and receive directional TCAS and directional DME communications;
- wherein the multi-function directional antenna is only used to transmit and receive directional DME communications after a receipt of a squitter signal from a ground station.

16. The method of claim 15, further comprising the steps of using the directional antenna to engage in TCAS and directional DME communications.

17. The method of claim 15, further comprising the steps of:
- providing the directional antenna with a plurality of directional antenna elements;
- providing the integrated radio comprises a plurality of electronically steered transceivers;
- associating each transceiver with a corresponding directional antenna element.

18. The method of claim 15, further comprising the steps of:
- providing the directional antenna comprises a plurality of directional antenna elements and a switching matrix; and
- providing the integrated radio with a transmitter;
- providing the integrated radio with a plurality of receivers with each receiver associated with a corresponding directional antenna beam; and
- providing the antenna with a Butler matrix beam steering network interconnecting the transmitter and the receivers with the switching matrix.

19. The method of claim 15, further comprising the step of providing the DME controller, the TCAS controller, and the multi-function directional antenna as original equipment components of an original equipment avionics platform.

20. The method of claim 15, further comprising the step of configuring the DME controller and the TCAS with separate power amplifiers.

21. The method of claim 15, further comprising the step of configuring the DME controller and the TCAS with a common, multi-function power supply.

22. The method of claim 15, further comprising the step of sharing communications over the multi-function directional antenna when DME and TCAS operations are concurrently active.

23. The method of claim 15, further comprising the steps of receiving a DME squitter while TCAS communication are active and switching to a shared communication mode in which directional DME and TCAS communications are concurrently transmitted and received via the multi-function directional antenna.

24. An avionics system configured for location onboard an aircraft, comprising:

a traffic collision avoidance system (TCAS) controller;

a distance measuring equipment (DME) controller;

an airborne transponder system controller an integrated radio coupled to the TCAS controller, transponder controller and to the DME controller; and a multi-function directional antenna operatively connected to the integrated radio configured to transmit and receive transponder, directional TCAS and directional DME communications;

wherein the directional antenna comprises a plurality of directional antenna elements and the integrated radio comprises a plurality of electronically adjusted transceivers, which in conjunction with the antenna forms an electrically steered array;

wherein the multi-function directional antenna is only used to transmit and receive directional DME communications after receipt of a squitter signal from a ground station.

25. An avionics system configured for location onboard an aircraft, comprising:

a traffic collision avoidance system (TCAS) controller;

a distance measuring equipment (DME) controller;

an airborne transponder system controller an multi-function directional antenna with an integrated radio coupled to the TCAS controller, transponder controller and to the DME controller configured to transmit and receive transponder, directional TCAS and directional DME communications;

wherein the multi-function directional antenna is used to transmit and receive directional DME communications when a squitter signal is received from a ground station and the DME controller sets a power and selects a directional beam of the multi-function directional antenna and engages in directional DME communications with the ground station.

* * * * *